PHILIP O'REILLY, OF HARTFORD, CONNECTICUT.

Letters Patent No. 91,038, dated June 8, 1869.

IMPROVED BLACK PIGMENT FROM MINERAL CARBON.

The Schedule referred to in these Letters Patent and making part of the same;

*To all whom it may concern:*

Be it known that I, PHILIP O'REILLY, of Hartford, in the county of Hartford, and State of Connecticut, have invented a new and improved Compound; and I do hereby declare that the following is a full, clear, and exact description thereof, which will enable others skilled in the art to make and use the same.

The object of this invention is to provide a compound for producing a fine jet in black paints, and for other purposes; and It consists in pulverizing anthracite and bituminous coals, by grinding in water, or other equivalent liquid, so as to form an impalpable powder, when dry, and in treating the said powder with a mineral acid, for the purpose of changing its character, and giving it a finer jet color, and a greater affinity for oils.

I do not confine myself to any one of the mineral acids in forming the composition, but prefer sulphuric acid, specific gravity 14, and sufficient quantity for the purpose intended.

I use this paste composition in combination with gutta-percha, India rubber, and other elastic gums, in the manufacture of textile fabrics, as well as for paints.

In preparing the composition, the coal is first ground to a fine powder, and then water or other liquid is added, to form a paste.

This paste is then ground in a suitable mill, and then it is mixed with the acid, which is thoroughly incorporated therewith, and the compound is left at rest for some hours. It is then washed with water, to free it from all traces of the acid. It is then dried, after which it is ready for use.

Having thus described my invention,

I claim as new, and desire to secure by Letters Patent—

A compound, formed of anthracite and bituminous coals, treated with mineral acid, substantially as and for the purposes herein described.

PHILIP O'REILLY.

Witnesses:
ELISHA JOHNSON,
THOMAS McMANUS.